(12) United States Patent
Barzilai et al.

(10) Patent No.: US 8,456,990 B2
(45) Date of Patent: Jun. 4, 2013

(54) QUALITY OF SERVICE FOR ISCSI

(75) Inventors: Tsipora Barzilai, Tel-Aviv (IL); John Marberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 12/061,671

(22) Filed: Apr. 3, 2008

(65) Prior Publication Data
US 2010/0165841 A9  Jul. 1, 2010

Related U.S. Application Data

(63) Continuation of application No. 10/335,323, filed on Dec. 31, 2002, now Pat. No. 7,376,082.

(51) Int. Cl.
*H04L 1/00* (2006.01)

(52) U.S. Cl.
USPC ........................................... 370/230.1

(58) Field of Classification Search
USPC ....................... 370/229, 230, 230.1
See application file for complete search history.

(56) References Cited

U.S. PATENT DOCUMENTS

2003/0079019 A1* 4/2003 Lolayekar et al. ............ 709/226
2005/0036546 A1* 2/2005 Rey et al. ................ 375/240.12

* cited by examiner

*Primary Examiner* — Mark Rinehart
*Assistant Examiner* — Mohammad Anwar

(57) ABSTRACT

An initiator node adapted to provide quality of service (QoS) for an Internet Small Computer System Interface (iSCSI) environment is provided. The initiator node including an iSCSI initiator comprising a QoS shaper, the QoS shaper for shaping one or more Protocol Data Units (PDUs) according to QoS policies and providing shaped PDUs, and a Transmission Control Protocol (TCP) layer for receiving the shaped PDUs from the iSCSI initiator and comprising a QoS marker for marking the shaped PDUs according to the QoS policies, wherein the PDUs are command PDUs and wherein the shaper shapes the command PDUs before the command PDUs receive command sequence numbers.

15 Claims, 4 Drawing Sheets

QUALITY OF SERVICE FOR ISCSI

CROSS-REFERENCE TO RELATED APPLICATIONS

The subject application is a continuation of U.S. patent application Ser. No. 10/335,323, filed 31 Dec. 2002, (now U.S. Pat. No. 7,376,082). This Application shares disclosure with U.S. patent application Ser. No. 11/923,692, filed 4 Dec. 2007.

FIELD OF THE INVENTION

The present invention relates to Quality of Service in general, and more particularly to Quality of Service in network storage systems.

BACKGROUND

Quality of Service (QoS) broadly refers to a network's ability to provide better service to selected network traffic. QoS can be characterized by several basic performance criteria, including availability, error performance, response time, lost traffic or poor transmission due to network congestion, and so on.

While QoS for networks is a fairly developed field, network storage systems pose special problems which are not addressed by prior art QoS protocols and techniques. As an example, in an Internet Protocol (IP) network, most of the heavy traffic is from the server to the client. Typically, the traffic may be in the form of downloads from the server to the client. Accordingly, prior art QoS techniques are designed to address unidirectional traffic from server to client.

However, in network storage, heavy traffic may be bidirectional, such as either a read activity or a write activity. Read activities may create heavy traffic from the storage server to the client. In contrast, write activities may create heavy traffic from the client to the storage server. Prior art QoS techniques are not equipped to address bidirectional traffic.

Another network storage issue is non-compliant clients. In IP network traffic, most of the traffic from the client is negligible in comparison to the traffic from the server. Consequently, damage caused by clients that are non-compliant with service level agreements is typically inconsequential. Thus, prior art QoS techniques do not address the issue of non-compliant clients. In contrast, in network storage systems, a non-compliant client may initiate a number of heavy traffic activities, such as read or write of data. In QoS for network storage, there is therefore a need to track and contain traffic of non-compliant clients. This need is currently not met by prior art QoS techniques.

The above are just two examples of the inability of prior art QoS techniques to address QoS issues for network storage systems. There is therefore need to provide QoS techniques that can address the unique and specific issues of network storage systems.

SUMMARY

The Internet Small Computer System Interface (iSCSI) protocol enables transporting the Small Computer System Interface (SCSI) protocol over Transmission Control Protocol (TCP). iSCSI traffic is typically bidirectional traffic between an initiator and a target that reside on separate network nodes. iSCSI traffic exploits shared network and input/output (I/O) resources, and thus is subject to congestion.

One objective of the present invention is to provide QoS techniques and protocols to differentiate iSCSI traffic from other network traffic. Similarly, it is an additional objective to provide QoS techniques and protocols that differentiate and prioritize various instances of iSCSI traffic, for example, traffic from different initiators and traffic to different logical units (LUs).

A preferred embodiment of the present invention may provide end-to-end QoS for iSCSI. The present inventive QoS techniques and protocols may provide control and management of multiple resources along the flow path from initiator to target, and back.

Some embodiments of the present invention may constrain iSCSI traffic to a certain portion of the network bandwidth, thus allowing other traffic sufficient quality of service.

According to one aspect of the present invention, there is therefore provided an initiator adapted to provide quality of service for an iSCSI environment. The initiator includes an iSCSI initiator and a TCP layer. The iSCSI initiator includes a QoS shaper for shaping one or more PDUs according to QoS policies. The TCP layer receives the PDUs from the iSCSI initiator, and includes a QoS marker for marking the PDUs according to the QoS policies.

Preferably the QoS policies include policies for network resources and policies for I/O resources.

In alternative embodiments, the PDUs are command PDUs. In such cases, the shaper shapes the command PDUs before they receive command sequence numbers.

In other alternative embodiments, the PDUs are data PDUs and command PDUs. The data PDUs and command PDUs are shaped before being received in the TCP layer.

The present embodiment may also include a second shaper in the TCP layer. The second shaper shapes network traffic of applications other than iSCSI.

According to another aspect of the present invention, there is therefore provided a target adapted to provide quality of service for an iSCSI environment. The target includes a first and second QoS component.

The first QoS component is in an iSCSI target and handles I/O resources. The first QoS component shapes read commands and write commands according to QoS policies. As such, the first QoS component provides QoS for traffic from a non-compliant initiator.

The second QoS component is in a TCP layer and handles network resources. iSCSI PDUs are shaped and marked according to QoS policies of iSCSI.

Alternatively, the target provides access to a plurality of logical units (LU). Each of the LUs have multiple task-sets, and each of the task-sets have an associated class of service. In some embodiments, two or more of the associated classes of service are the same. In alternative embodiments, two or more of the associated classes of service are different from each other.

According to another aspect of the present invention, there is therefore provided a system adapted to provide quality of service (QoS) for an iSCSI environment. The system includes one or more initiators and one or more targets. In some embodiments, the system also includes a service level agreement (SLA) agent. The agent communicates with the initiators and targets, and provides the initiators and the targets with the QoS policies.

In alternative embodiments, the QoS policies used by the initiator are different from the QoS policies used in the target. Additionally, the initiators and the targets may support a multiplicity of separate connections for a multiplicity of classes of service per an iSCSI session.

According to yet another aspect of the present invention, there is therefore provided a QoS system adapted for an iSCSI environment. The QoS system includes a plurality of filter specification attributes. One or more of the filter specification attributes are adapted to reflect iSCSI traffic types.

In some embodiments, the filter specification attributes include TCP four-tuple, iSCSI session id, LUN, initiator user id and/or application identification attributes. Alternatively, the filter specification attributes are adapted to provide QoS for network resources and I/O resources.

Typically, the filter specification attributes are used by one or more initiators and by one or more targets. In some cases the filter specification attributes used by the initiators are different from the filter specification attributes used by the targets.

According to still another aspect of the present invention, there is therefore provided another QoS system adapted for an iSCSI environment. The QoS system includes a plurality of flow specification parameters. One or more of the flow specification parameters are adapted for iSCSI traffic types.

In some embodiment the flow specification parameters include I/O rate, byte rate and/or I/O flow excess. Alternatively, the flow specification parameters are adapted to provide QoS for network resources and I/O resources.

Typically, the flow specification parameters are used by one or more initiators and by one or more targets. In some cases, the flow specification parameters used by the initiators are different from the flow specification parameters used by the targets.

According to another aspect of the present invention, there is therefore provided yet another QoS system adapted for an iSCSI environment. The QoS system includes a shaper, a marker and a first target QoS component.

The shaper is in an iSCSI initiator and shapes one or more PDUs according to QoS policies. The marker is in a TCP layer in an initiator and receives the PDUs from the iSCSI initiator. The marker also marks the PDUs according to the QoS policies. The first target QoS component is in an iSCSI target. The first target QoS component receives one or more commands extracted from the PDUs and shapes the commands according to QoS policies.

In some embodiments, the first target QoS component handles I/O resources. Alternatively, the system also includes a second target QoS component in a TCP layer. The second target QoS component handles network resources. The iSCSI PDUs are shaped and marked according to QoS policies for iSCSI.

According to another aspect of the present invention, there is therefore provided a method for providing QoS for an iSCSI environment. The method includes shaping one or more PDUs in an iSCSI initiator according to QoS policies. The method also includes marking the PDUs in a TCP layer at an initiator according to the QoS policies. Where the PDUs are command PDUs, the method includes shaping the command PDUs before assigning them command sequence numbers. The shaping of the command PDUs is typically done according to QoS policies for I/O resources.

In some embodiments, the command PDUs are write command PDUs containing immediate data. The write command PDUs are shaped according to QoS policies for network resources and also according to QoS policies for I/O resources.

In alternative embodiments, the PDUs are data PDUs and command PDUs. The shaping of the data PDUs and command PDUs in the iSCSI initiator occurs before sending the data PDUs and the command PDUs to the TCP layer. When the PDUs are data PDUs, the data PDUs are shaped according to QoS policies for network resources.

The method alternatively includes sending the PDUs over an IP network to a target. Read commands and write commands are extracted from the PDUs, and shaped, in an iSCSI target, according to QoS policies for I/O resources, thereby providing QoS for non-compliant traffic.

According to another aspect of the present invention, there is therefore provided an additional method for providing QoS for an iSCSI environment. The method includes receiving data from one or more LUs at an iSCSI target and shaping and marking the data in a QoS component according to QoS policies for iSCSI. The QoS policies are policies for network resources.

According to another aspect of the present invention, there is therefore provided a system for providing quality of service for in an iSCSI environment. The system includes means for shaping one or more PDUs in an iSCSI initiator according to QoS policies. The system also includes means for marking in a TCP layer at an initiator the shaped PDUs according to the QoS policies.

According to another aspect of the present invention, there is therefore provided a computer program embodied on computer readable medium software. The computer program includes a first segment operative to shape one or more PDUs in an iSCSI initiator according to QoS policies. A second segment is operative to mark in a TCP layer at an initiator the shaped PDUs according to the QoS policies.

In alternative embodiment, the program includes a third segment operative to receive, over an IP network, the PDUs at a target. A fourth segment is operative to shape, in an iSCSI target, read commands and write commands according to QoS policies, thereby providing QoS for non-compliant traffic.

BRIEF DESCRIPTION

Embodiments of the invention will now be described, by way of example, with reference to the accompanying drawings, in which.

Figure 2A:
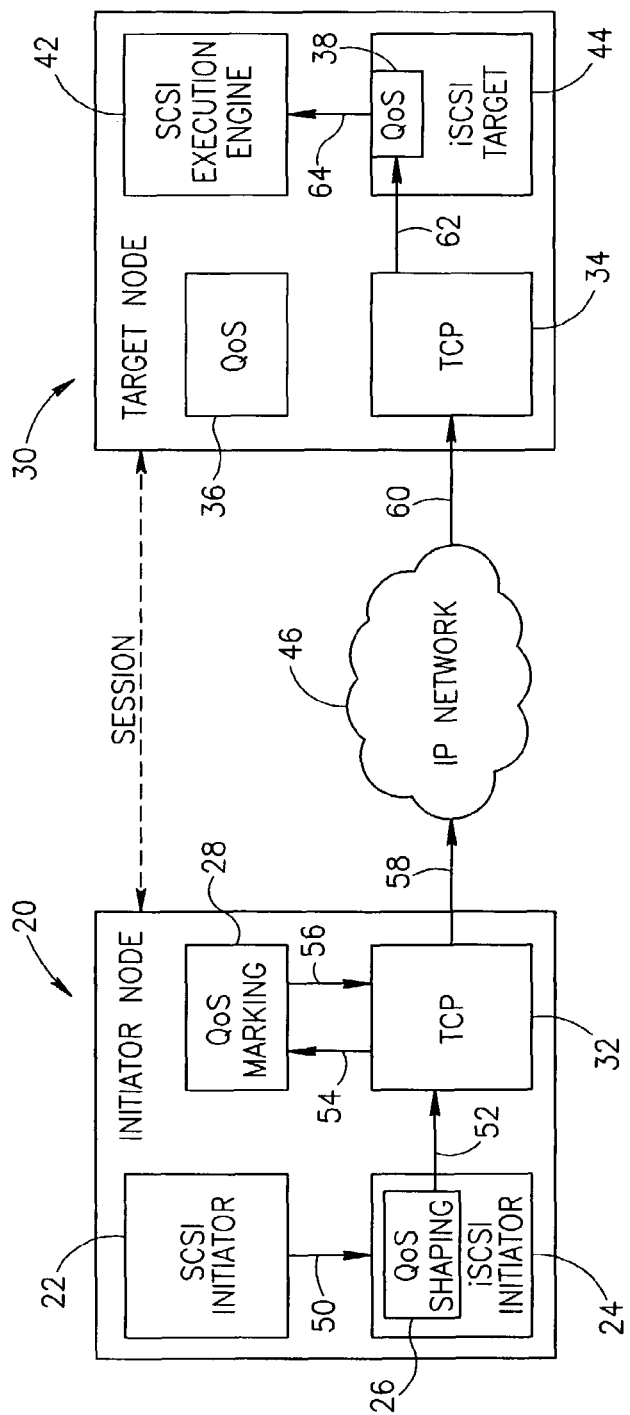
FIG. 2A is a block diagram of a session between an initiator and a target and illustrating traffic flow of command Protocol Data Units (PDUs) from the initiator to the target, constructed and operated according to an embodiment of the present invention.
Figure 2B:
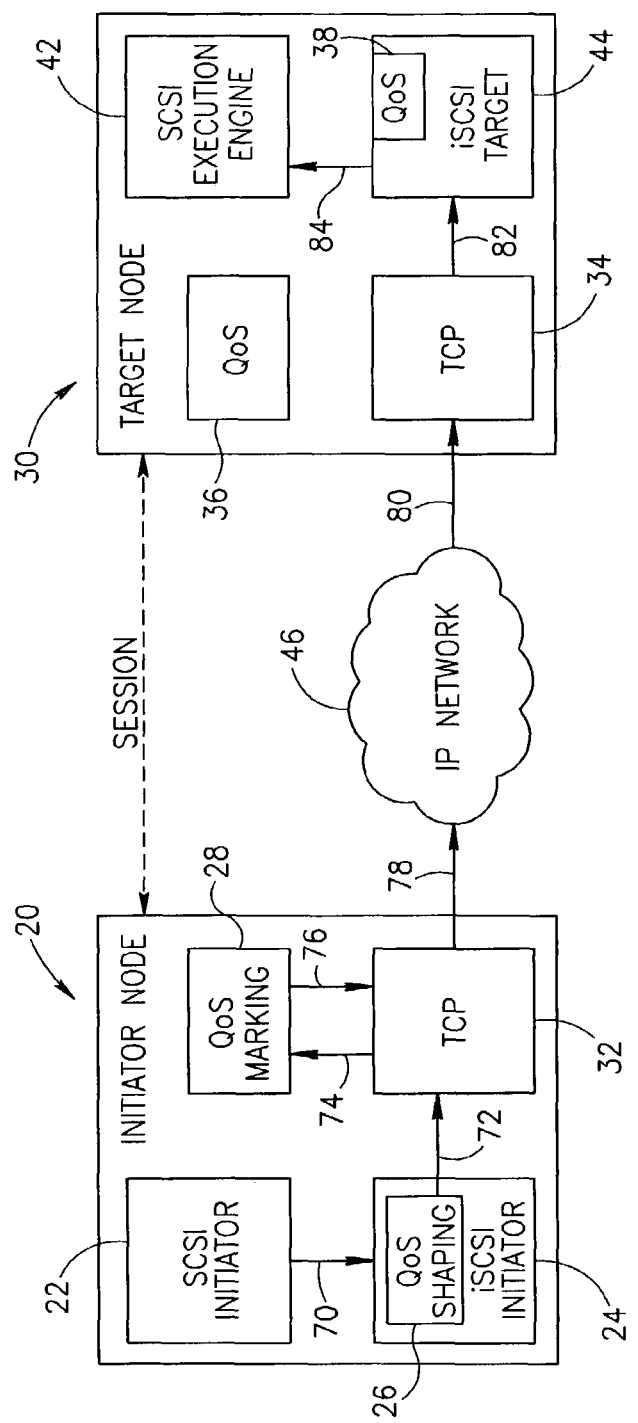
Figure 3:
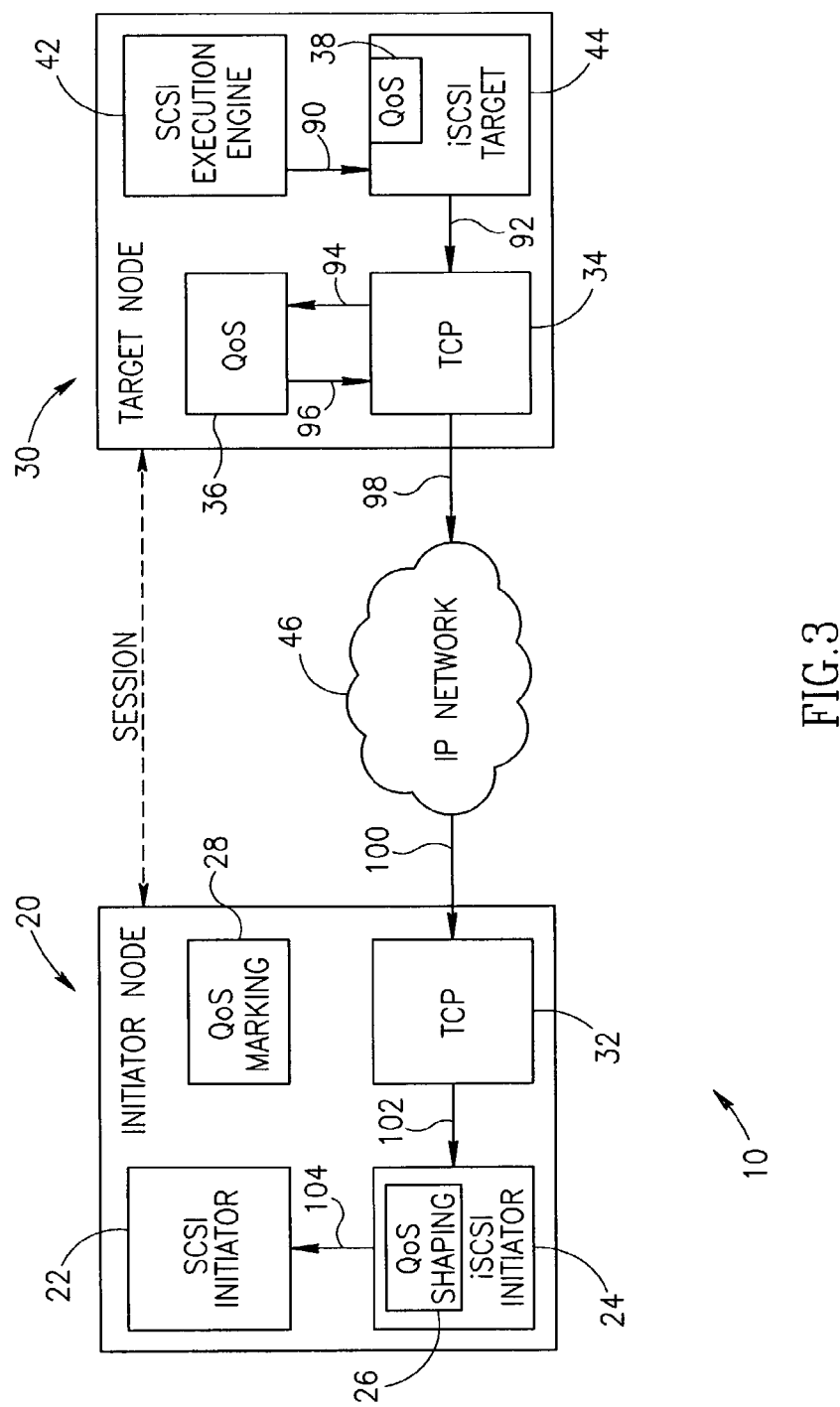

FIG. 2B is a block diagram of a session between an initiator and a target and illustrating traffic flow of data PDUs from the initiator to the target, constructed and operated according to an embodiment of the present invention; and FIG. 3 is a block diagram of a session between an initiator and a target and illustrating traffic flow of data PDUs from the target to the initiator, constructed and operated according to an embodiment of the present invention.

DETAILED DESCRIPTION

Glossary

Class of Service (CoS)
Method of managing traffic, such as in a network, by grouping similar types of traffic in a class that has a given level of service priority. Classes are determined by a set of attributes relevant to the traffic domain (see Filter Specification). The term is also used to refer to a specific class of service.

Command Descriptor Block (CDB)
Data structure that contains a SCSI command and its attributes. The CDB is sent in a command PDU from an iSCSI initiator to an iSCSI target. The CDB is defined in the SCSI architecture.

Command PDU
PDU in the iSCSI protocol that contains details of an SCSI command, specifically the CDB. A command PDU may also contain immediate data-out.

Command Sequence Number
Numeric value associated with a SCSI command by the iSCSI protocol. Sequence numbers are assigned by the iSCSI initiator and carried in a field in the command PDU. Command sequence numbers are session-wide, and are used for sequential in-order delivery of commands at the target across all connections of the session. The iSCSI target is required to deliver commands to the SCSI execution engine in the sequential order of the command sequence numbers.

Connection
TCP connection between an initiator node and a target node. Each connection belongs to a session. There may be multiple connections in a session. Each connection has a unique id in the iSCSI protocol. A connection can also be identified at each end by the local TCP port number. Each connection is associated with a single class of service. Multiple connections may be used to support multiple classes of service in a session.

Connection Allegiance
iSCSI requirement to send all PDUs of an individual SCSI command over the same connection, in both directions. This includes the command PDU, data PDUs, and response and control PDUs.

Data In
Data that as part of the protocol of a SCSI read command is sent from a target to an initiator.

Data-Out
Data that as part of the protocol of a SCSI write command is sent from an initiator to a target. Data-out can be either solicited by the target or unsolicited.

Data PDU
PDU in the iSCSI protocol that contains data-in or data-out.

Differentiated Services (DiffServ)
Standard (RFC 2474) for implementing scalable service differentiation in the Internet, based on traffic classification. DiffServ is defined by the Networking working group of the Internet Engineering Task Force (IETF).

Filter Specification
Set of attributes, used in determining the class of service of traffic. Examples of filter specification attributes may include TCP four-tuples, LUN, session id, etc.

Flow
The finest granularity of traffic streams distinguishable by the DiffServ architecture.

Flow Specification
Set of parameters used in describing a flow. Examples of flow specification parameters may include bandwidth requirements, acceptable maximum delays, loss rates, etc. Each class of service has its own flow specification.

Generic SCSI Execution Engine
SCSI execution engine that is not associated with definite I/O resources. The execution engine can either access local SCSI LUs, or serve as a gateway to another network, such as a storage area network (SAN).

Immediate Data
Data-out that is sent as part of the iSCSI write command PDU. It constitutes the first (or only) portion of unsolicited data. Immediate data has a maximum size, negotiable between initiator and target.

Initiator*
The client in the iSCSI protocol. It sends requests to servers, known as targets, to access data stored in logical units. The term is also used to identify the system component (driver) that implements the initiator function. The term also refers to a client in the SCSI protocol, and to the system component (driver) that implements this function.

Initiator Node*
Network node that embodies the functions of a SCSI and/or iSCSI initiator.

* It is noted that herein the term "initiator" generically refers to iSCSI initiator, SCSI initiator, or initiator node, depending on the context.

iSCSI
Internet SCSI—a mapping of the SCSI protocol onto the TCP transport. In iSCSI, the initiator and the target reside on separate network nodes, and communicate via PDUs transmitted over TCP. iSCSI is a standard, defined by the Internet Protocol Storage (IPS) working group of the Internet Engineering Task Force (IETF).

I-T-L Nexus
A relationship between a specific initiator, a specific target, and a specific logical unit, defining a context in which SCSI commands are delivered. The term is loosely related to a task-set.

Logical Unit (LU)
Data device accessible at the target and upon which SCSI commands are executed. Each target may provide access to multiple logical units. Each logical unit is uniquely identifiable.

Logical Unit Number (LUN)
The unique number that identifies each logical unit at the target. The term is also used to refer to a specific logical unit.

Marking
The process of setting the TOS byte in the IP header of a packet, based on a defined policy.

Non Compliant Initiator
iSCSI initiator that generates non-compliant traffic.

Non Compliant Traffic
Traffic that does not comply with the flow specification of a particular class of service.

Policy
Formal set of statements that define how resources, such as in a network, are to be shared among customers.

Protocol Data Unit (PDU)
Message sent from initiator to target or vice versa, as part of the iSCSI protocol. PDUs contain commands, responses, control information, and data.

SCSI
Small Computer System Interface—a family of protocols for communicating with I/O devices, especially storage devices. SCSI is a standard defined by the T10 technical committee of the National Committee for Information Technology Standards (NCITS). It provides a client/server architecture where clients (called initiators) send commands to servers (called targets) to perform I/O services, such as reading and writing of data.

SCSI Execution Engine
Component at the target node. The SCSI execution engine is responsible for receiving from the iSCSI target SCSI commands extracted from command PDUs, and submitting the commands for execution.

Service Level Agreement (SLA)

Contract between a service provider and a customer that specifies, usually in measurable terms, what services will be furnished by the service provider to the customer.

Service Level Agreement (SLA) Server

Node on the network that maintains SLAs and is able to translate them into policies. The SLA server is responsible for disseminating the policies to other network nodes.

Session

Association between a specific initiator and a specific target in the iSCSI protocol. A session consists of one or more connections. The session provides to the initiator a consistent view of a collection of LUs accessible at the target. SCSI commands are delivered at the target in session-wide sequential order, enforced by command sequence numbers. Each session has a set of attributes that govern the protocol, and are negotiable between initiator and target. Each session is identified by a unique identifier at each side of the session. There may be multiple sessions between each initiator and target.

Shaping

The process of delaying traffic within a class of service, to cause it to conform to a defined flow specification.

Solicited Data

Data-out that is sent in response to a solicitation from the target. Solicitation is in the form of a request to transmit (R2T) PDU from the target. There may be multiple R2Ts for a given write command, each soliciting a different portion of the data. The number of R2Ts and size of each data portion are determined by the target.

Target**

The server in the iSCSI protocol. It provides access to a collection of LUs. The target receives requests from clients (called initiators). The term is also used to identify the system component (driver) that implements the target function. The term also refers to a server in the SCSI protocol and to the system component (driver) that implements this function.

Target Node**

Network node that embodies the functions of a SCSI and/or iSCSI target.

** It is noted that herein the term "target" generically refers to iSCSI target, SCSI target, or target node, depending on the context.

Task iSCSI request originating from the initiator, for which a response from the target is pending. The term also refers to a SCSI command or linked list of SCSI commands in progress, as defined in the SCSI architecture.

Task-Set

Collection of tasks that access the same logical unit. Depending on configuration at the target, for each LU there exists either a single task-set containing tasks from all initiators, or a separate task-set per initiator. The latter corresponds to an I-T-L Nexus.

Type of Service (TOS) Byte

The IP version 4 header 'type of service' octet field, or the IP version 6 'traffic class' octet field, when interpreted in conformance with DiffServ.

Unsolicited Data

Data-out that is sent without waiting for solicitation from the target. Unsolicited data has a negotiable maximum size, and is sent in one or more data PDUs. The first portion of unsolicited data may be immediate data.

DESCRIPTION OF INVENTION

Figure 1:
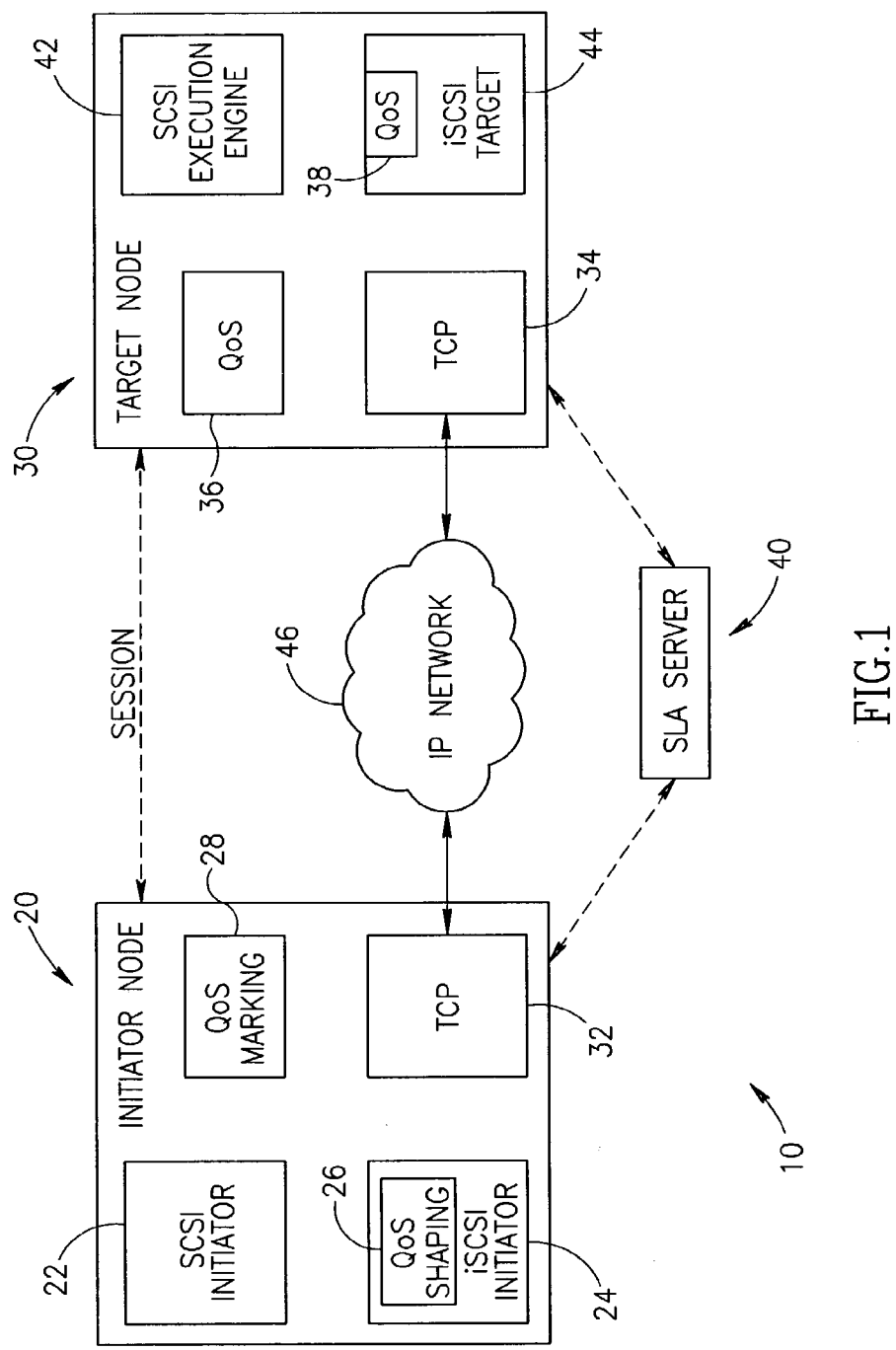
FIG. 1 is a block diagram of a Quality of Service (QoS) architecture and system for a network storage environment, constructed and operated according to an embodiment of the present invention.

Reference is now made to FIG. 1, a Quality of Service (QoS) architecture and system 10 for a network storage environment, such as an iSCSI environment. QoS 10 may provide techniques and protocols for end-to-end Quality of Service for iSCSI traffic.

For clarity of explanation, it is noted that iSCSI enables transporting the SCSI protocol over TCP. While the present invention is described within the iSCSI environment, it is apparent to those skilled in the art that the present invention may apply to other techniques or protocols that provide network storage capabilities.

A preferred embodiment of the present invention adapts existing networking QoS techniques for use in the iSCSI environment, however, with major methodological differences. Some of the main issues left unaddressed by prior art QoS systems, however addressed by QoS system 10, are:

1) End-to-end QoS for iSCSI involves multiple types of resources, including network resources and I/O resources. The I/O resources may be logical units. Prior art QoS techniques addressed only one type of resource, typically the network resource.

2) Transporting SCSI traffic over an IP network poses unique challenges to QoS for networks, such as a) Strict time-sensitivity—iSCSI traffic is typically more sensitive to response time than other IP network traffic due to SCSI performance requirements. The transport of storage traffic over the network may introduce extra delay, as well as potential data loss, both of which affect the response time; and b) Long lived communication sessions—Typical uses of network connections are of short lived. Conversely, connections of iSCSI sessions are intended to be of long lived.

c) iSCSI traffic is bidirectional. In an IP network typically, most of the heavy traffic is unidirectional, from the server to the client. As an example, in the form of downloads from the server to the client.

Prior art QoS techniques do not address any of the unique issues listed in sections 2a), b) and c).

3) Dependencies on requirements of the iSCSI protocol. In prior art, networking QoS techniques and protocols are implemented in the TCP layer. For reasons to be detailed hereinbelow, due to the iSCSI requirements, it is not possible to implement all the QoS techniques and protocols for iSCSI in the TCP layer.

4) The iSCSI initiator may be non-compliant with service level agreements. In the distributed environment of iSCSI, some initiators may be non-compliant with QoS policies, or even may have no QoS implemented at all. Such initiators could flood the target with command PDUs causing I/O congestion at the target. The target should have QoS methods that protect against this situation. In prior art, the destination does not track non-compliant sources.

A preferred embodiment of the present invention adapts DiffServ techniques and protocols for filter and flow specifications. The present invention has additionally identified new filter specification attributes and new flow specification parameters.

In a preferred embodiment, multiple QoS components each may handle a portion of the iSCSI traffic. As such, each QoS component may be positioned at a different resource along the end-to-end path of the iSCSI traffic, and may handle a specific type of traffic, such as commands, data-in and data-out.

As to be described in detail hereinbelow, the layout of the QoS components may be affected by the dependencies on iSCSI. Some of the QoS activities may occur in the TCP layer, while other QoS activities may occur in the iSCSI components.

As is apparent to those skilled in the art, the present QoS techniques differ from the prior art network QoS techniques where all traffic is handled in the TCP layer.

Referring again to FIG. 1, QoS system 10 comprises an initiator node 20, a target node 30 and a SLA server 40. The elements in QoS 10 communicate via an IP network 46. Although for purposes of clarity FIG. 1 illustrates only one initiator node 20 and one target node 30, it is apparent to those skilled in the art that QoS 10 may comprise many initiator nodes 20 and/or many target nodes 30 and still fall within the principles of the present invention. SLA server 40 may be a separate server that communicates with one or more initiators 20 and one or more targets 30. It is noted that SLA servers are known in the art elements and will not be discussed further herein.

Initiator node 20 may comprise an SCSI initiator component 22, an iSCSI initiator component 24, a QoS shaping component 26, a QoS marking component 28 and TCP layer 32. Target node 30 may comprise a SCSI execution engine component 42, an iSCSI target component 44, TCP layer 34, and QoS components 36 and 38.

A session may be established between initiator node 20 and target node 30. It is apparent to those skilled in the art that although only one session is illustrated in FIG. 1, there may be multiple sessions between each initiator node 20 and each target node 30, and still fall within the true spirit and principles of the present invention.

QoS 10 uses QoS policies for two types of resources: network and I/O. It is noted that shaping component 26 at initiator 20 may handle both types of resources. Additionally noted, QoS components 36 and 38 may each handle one type of resource. QoS 36 handles the network resources and QoS 38 handles the I/O resources. Also noted, the QoS policies used at the initiator may be the same as, or different from, the QoS policies used at the target.

In some preferred embodiments, SCSI execution engine 42 may be generic. When SCSI execution engine 42 is a gateway to another network, such as a storage area network (SAN), SCSI execution engine 42 may be responsible for continuing the enforcement of QoS in the other network.

It is noted that in prior art embodiments both QoS shaping and marking take place in the TCP layer. In preferred embodiments of the present invention, shaping at the initiator node may be moved from TCP into the iSCSI initiator. Shaping is performed before TCP in order to resolve a potential race condition between QoS policy and iSCSI protocol requirements, as to be explained in full hereinbelow. Marking is then performed in TCP.

It is also noted that at the target node there is no such potential race condition. As such, both shaping and marking may be performed in TCP.

The following listed figures illustrate iSCSI traffic flow:

1) FIG. 2A illustrates the session between initiator 20 and target 30. FIG. 2A further illustrates the flow of SCSI read/write commands from initiator 20 to target 30.

2) FIG. 2B illustrates the session between initiator 20 and target 30. FIG. 2B further illustrates the flow of data-out PDUs from initiator 20 to target 30.

3) FIG. 3 describes the session between initiator 20 and target 30. FIG. 3 further illustrates the flow of data-in PDUs from target 30 to initiator 20.

Traffic Flow of Command PDUs from Initiator 20 to Target 30

Reference is now made to FIG. 2A, an illustration of the session between initiator 20 and target 30, overlaid with an exemplary traffic flow of SCSI read and write commands.

SCSI commands originate in the SCSI initiator 22. The commands may then be transferred (arrow 50) to the iSCSI initiator 24. iSCSI initiator 24 may pack each command in a PDU and then submit the command PDUs to QoS shaping component 26 for shaping.

It should be noted that shaping component 26 is in iSCSI, not in TCP, as is known in the art. A present purpose of performing the shaping in iSCSI before TCP is to resolve a potential race condition between QoS policy and iSCSI protocol requirements, as to be explained hereinnow.

Command PDUs sent by the iSCSI initiator 24 to TCP carry a command sequence number. The command sequence numbers are used for sequential in-order delivery of commands at the target 30, over multiple connections of the same session. If shaping at the initiator were to be preformed in TCP, a command PDU with a lower command sequence number could be held back, in TCP, on a connection associated with a slow class of service. Meanwhile, another command PDU with a higher sequence number may arrive at the iSCSI target 44 over a connection with a fast class of service. Because of the order of sequence numbers, the latter command, with the fast network class of service, would be delayed at iSCSI target 44 waiting for the former command with the slow network class of service. This behavior could cause performance degradation and defeat the purpose of QoS.

To resolve the potential race condition, shaping at initiator 20 is performed before assigning a command sequence number. In preferred embodiments of the present invention, shaping component 26 is placed within iSCSI initiator 24.

In the present invention, command PDUs are shaped according to QoS policies for I/O resources. If a command PDU also contains immediate data, the PDU is additionally shaped according to QoS policies for network resources.

The iSCSI initiator 24 may then send (arrow 52) the command PDUs to TCP layer 32. TCP layer 32 may then send (arrow 54) the traffic to QoS marking component 28.

The marked traffic may be returned (arrow 56) to the TCP layer 32. As a process known in the art, TCP layer 32 may send (arrow 58) the command PDUs via the IP network 46 to target 30.

TCP layer 34 of target 30 may then receive (arrow 60) the command PDUs. TCP layer 34 may deliver (arrow 62) the command PDUs to the iSCSI target 44. iSCSI target 44 may extract the SCSI commands and submit them to QoS component 38 for shaping. QoS component 38 may shape the commands before delivering them to SCSI execution engine 42. It is noted that although the commands may already have been shaped by QoS shaping component 26, they may still be submitted to QoS component 38 for shaping. This is because of the potential existence of non-compliant initiators, as explained above in item 4 of issues addressed by the present invention. The iSCSI target 44 is unable to distinguish between compliant and non-compliant traffic, and must therefore submit all arriving command PDUs for shaping.

It is noted, that commands from compliant initiators 20 that have already been shaped by QoS shaping component 26 may not be affected by additional shaping at QoS component 38.

iSCSI target 44 then may deliver (arrow 64) the commands to the SCSI execution engine 42 in the appropriate order.

It is noted that the present illustration depicts QoS marking component 28 as being separate from TCP layer 32. However, in alternative embodiments, QoS marking component 28 may be within TCP layer 32 and still fall within the principles of the present embodiment.

It is additionally noted that marking component 28 may be responsible for marking all network traffic outgoing from initiator node 20, including traffic from applications other than iSCSI. Additionally, initiator node 20 may contain a second shaping component (not shown) in the TCP layer. The second shaping component may be responsible for shaping network traffic of applications other than iSCSI. It is appreciated that the above alternatives are included within the true spirit and scope of the present invention.

Traffic Flow of Data-Out PDUs from Initiator 20 to Target 30

Reference is now made to FIG. 2B, an illustration of the session between initiator 20 and target 30, overlaid with an exemplary traffic flow of data-out PDUs.

Data-out originates in the SCSI initiator 22, which may transfer it (arrow 70) to iSCSI initiator 24. The iSCSI initiator 24 may create data-out PDUs, and the data-out PDUs may then be submitted to QoS shaping component 26 for shaping.

QoS shaping component 26 may send (arrow 72) the data-out PDUs to TCP layer 32. TCP layer 32 may submit (arrow 74) the traffic to QoS marking component 28 for marking. QoS marking component 28 may then return (arrow 76) the marked traffic to TCP 32, which may send (arrow 78) the data-out PDUs to the target 30 over IP network 46.

TCP layer 34 may receive (arrow 80) the data-out PDUs and deliver them (arrow 82) to the iSCSI target 44. The iSCSI target 44 may extract the data from the PDU and the data may then be delivered (arrow 84) to SCSI execution engine 42.

Traffic Flow of Data-In PDUs from Target 30 to Initiator 20

Reference is now made to FIG. 3 an illustration of the session between initiator 20 and target 30, overlaid with an exemplary traffic flow of data-in PDUs.

Data-in originates at SCSI LUs (not shown). In the present embodiment, SCSI execution engine 42 may transfer (arrow 90) data-in to iSCSI target 44. iSCSI target 44 may create data-in PDUs and conduit (arrow 92) the data-in PDUs to TCP layer 34.

As is known in prior art network QoS environment, the TCP layer 34 may then shape and mark the network traffic at the target. Accordingly, TCP layer 34 submits (arrow 94) the data-in PDUs to QoS component 36 for shaping and marking.

It is noted that the network filter specification at target node 30 may be simpler than at initiator node 20. This is because of iSCSI connection allegiance requirements and because each connection can have only one class of service in each direction. The initiator is responsible for selecting the connection for each command and the target must use this connection for all traffic of the command. Therefore, the class of service at the target may be determined simply from the identity of the connection or the identity of the initiator.

QoS component 36 may then return (arrow 96) the shaped/marked traffic to TCP layer 34. TCP layer 34 may send (arrow 98) the data-in PDUs to initiator 20 via the IP network 46.

TCP layer 32 may receive (arrow 100) the data-in PDUs and deliver (arrow 102) them to iSCSI initiator 24. iSCSI initiator 24 may extract the data from the PDU and deliver (arrow 104) the data-in to SCSI initiator 22.

It is noted that the present illustration depicts QoS component 36 as being separate from TCP layer 34. However, in alternative embodiments, QoS marking component 36 may be within TCP layer 34 and still fall within the principles of the present embodiment.

Additionally noted, in some embodiments, QoS component 36 may be responsible for shaping and marking of all network traffic going out of target node 30, including traffic from applications other than iSCSI.

Multiple Network Classes of Service

Each TCP connection can be associated with only one class of service in each direction. In order to provide multiple classes of service in a session, multiple connections may be used.

In some embodiments, iSCSI initiator 24 or iSCSI target 44 may be unable to support multiple connections per session. As an alternative, a separate session for each class of service may be used.

It is noted that the operating system environment or the file system used in initiator 20 may pose limitations requiring that multiple sessions access disjoint LUs. In this case, it may be impossible to use multiple network classes of service for access to the same LU from the same initiator.

Multiple I/O Classes of Service for the Same Logical Unit

The SCSI architecture provides the ability to configure logical units to use a separate task-set per each I-T-L nexus. Preferred embodiments of the present invention may therefore define multiple I/O classes of service for the same LU. The task-set of each I-T-L nexus, with its read commands and write commands, may be assigned a different I/O class of service. Alternatively, it may be possible to share an I/O class of service among multiple task-sets of the same LU, thereby giving traffic from several different initiators the same I/O class at the target.

I/O Flow Excess

Due to the bursty nature of system 10, there may be situations where command PDUs that are compliant with I/O flow specifications at the initiator, are non-compliant when arriving at the target. To smooth-out the bursty behavior, some embodiments of the present invention may allow I/O flow excess in selected I/O classes of service. The I/O flow specification used by QoS component 38 at target 30 may include parameters for excess byte rate and excess I/O rate.

It is noted that non-compliant commands at the target may be rejected by QoS component 38 with a "task-set full" or "busy" error. These errors should be prevented as much as possible. I/O flow excess parameters may compensate for transient non-compliances caused by system and network fluctuations. I/O flow excess will not compensate for initiators that do not use QoS at all.

Filter Specification and Flow Specification

Filter specification attributes may be selected that influence the differentiation of iSCSI flows in the presence of QoS. Examples of such filter attributes include TCP four-tuples (initiator and target IP address and port), LUN, initiator user ID, session ID, application identification attributes, time of activity, and so on. The above list is by way of example only, and is not meant to be limiting; it is appreciated that other filter attributes that are not listed, however that may influence the performance of iSCSI flows, are included within the breadth of the present invention.

It is noted that in some embodiments, there may be redundancy in the filter attributes. As an example, session id may be redundant when four-tuple is specified. Nevertheless, the redundancy may be used to support patterns when assigning a class of service. As an example, the same class may be assigned to all connections within a session. The classification methods allow using a subset of the attributes or a range of values for each attribute.

QoS 10 may use separate flow specifications for networking resources and for I/O resources.

For networking, standard flow specification parameters may be used, such as those as defined for DiffServ. Examples of network flow parameters may include average byte rate, peak byte rate, burst size.

For I/O, there are no existing standards. Preferred embodiments of QoS 10 may select flow specification parameters that affect the sharing of I/O resources of SCSI execution engine 42. Examples of flow parameters may include byte rate, I/O rate, I/O flow excess, and so on. The above list is by way of example only, and is not meant to be limiting; it is appreciated that other flow specification parameters that are not listed, however that may influence the sharing of SCSI execution engine 42, are included within the breadth of the present invention.

It is noted that some of the filter specification attributes and/or flow specification parameters used at the initiator may be different from those used at the target.

It is noted that I/O rate and byte rate may provide a tradeoff between random and sequential access. Random access is typically characterized by small data length, and is restricted mainly by I/O rate. On the other hand, sequential access is typically characterized by large data length, and is restricted mostly by byte rate.

The embodiments described herein apply to both software and hardware implementations of iSCSI and/or TCP/IP, and to any combinations of software and hardware implementation. Additionally, a node may have more than one network interface card or more than one network link. Also, multiple connections between initiator and target in the same session may use different IP addresses. All these variations are included within the true spirit and scope of the present invention.

While the methods, apparatus, and, systems disclosed herein may or may not have been described with reference to specific computer hardware or software, it is appreciated that the methods, apparatus, and, systems described herein may be readily implemented in computer hardware or software using conventional techniques.

While the present invention has been described with reference to one or more specific embodiments, the description is intended to be illustrative of the invention as a whole, and is not to be construed as limiting the invention to the embodiments shown. It is appreciated that those skilled in the art may be aware of various modifications that while not specifically shown herein, are nevertheless within the true spirit and scope of the invention.

The invention claimed is:

1. A target node adapted to provide quality of service (QoS) for an Internet Small Computer System Interface (iSCSI) environment, the target node comprising:
a first QoS component disposed in an iSCSI target externally to a Transmission Control Protocol (TCP) layer and receiving iSCSI Protocol Data Units (PDUs) comprising read commands and write commands via a data network from the Transmission Control Protocol (TCP) layer, at least a portion of the read commands and write commands being non-compliant with a governing QoS policy, said first QoS component operative for handling I/O resources and for shaping the non-compliant read commands and the non-compliant write commands according to the governing QoS policy, wherein shaping is performed by delaying the non-compliant read commands and write commands, wherein said target node provides access to a plurality of logical units (LU), each said LU having multiple task-sets, each said task-set having an associated class of service, wherein two or more of said associated classes of service are the same;
a SCSI execution engine that receives the delayed non-compliant read commands and write commands from the first QoS component; and
a second QoS component in the Transmission Control Protocol (TCP) layer for handling network resources of the data network, wherein iSCSI Protocol Data Units (PDUs) are shaped and marked according to the governing QoS policy.

2. The target node of claim 1, wherein the governing QoS policy includes one or more of the following: policies for network resources and policies for I/O resources.

3. A system adapted to provide quality of service (QoS) for an Internet Small Computer System Interface (iSCSI) environment, the system comprising:
one or more initiator nodes, each said initiator node comprising:
an iSCSI initiator comprising an initiator QoS shaper, said initiator QoS shaper operative for shaping one or more Protocol Data Units (PDUs) using first QoS policies by delaying the one or more PDUs to provide shaped PDUs;
a Transmission Control Protocol (TCP) layer that is external to said initiator QoS shaper and adapted for receiving said shaped PDUs from said iSCSI initiator, and comprising a QoS marker for marking said shaped PDUs according to said first QoS policies;
one or more target nodes for receiving said PDUs from said initiator node via the TCP layer over a data network, each said target node comprising a first QoS component disposed externally to the TCP layer in an iSCSI target for handling I/O resources, said first QoS component operative for shaping one or more read commands and one or more write commands extracted from said PDUs using second QoS policies, wherein at least a portion of the read commands and the write commands are non-compliant with the second QoS policies, and wherein shaping is performed in the first QoS component by delaying the non-compliant read commands and the non-compliant write commands, wherein the initiator nodes and the target nodes reside on separate nodes of the data network;
a SCSI execution engine that receives the delayed non-compliant read commands and write commands from the first QoS component; and
a second QoS component in the TCP layer for handling network resources, wherein iSCSI Protocol Data PDUs are shaped and marked using the second QoS policies.

4. The system of claim 3, wherein said second QoS policies include one or more of the following: policies for network resources and policies for I/O resources.

5. The system of claim 3, wherein said first QoS policies used by said initiator QoS shaper are different from said second QoS policies used by said first and second QoS components in said target node.

6. The system of claim 3, further comprising a service level agreement (SLA) agent in communication with said initiator nodes and said target nodes, wherein said SLA agent provides said initiator nodes and said target nodes with said first and second QoS policies.

7. The system of claim 3, wherein said initiator nodes and said target nodes support a multiplicity of separate connections for a multiplicity of classes of service in an iSCSI session.

8. The system of claim 3, further comprising a plurality of filter specification attributes, wherein one or more of said filter specification attributes are adapted to reflect iSCSI traffic types.

9. The system of claim 8, wherein said filter specification attributes include one or more of the following: TCP four-tuple, iSCSI session id, logical unit number (LUN), initiator user id and application identification attributes.

10. The system of claim 8, wherein said filter specification attributes are adapted to provide QoS for network resources and I/O resources.

11. The system of claim 8, wherein said filter specification attributes are used by one or more of said initiator nodes and by one or more of said target nodes, and wherein said filter specification attributes used by said initiator nodes are different from said filter specification attributes used by said target nodes.

12. The system according to claim 3, wherein at least one of said target nodes provides access to a plurality of logical units (LU), each said LU having multiple task-sets, each said task-set having an associated class of service, wherein two or more of said associated classes of service are the same.

13. A method for providing quality of service (QoS) for an Internet Small Computer System Interface (iSCSI) environment, the method comprising the steps of:
  in an initiator node shaping one or more non-compliant Protocol Data Units (PDUs) in an iSCSI initiator according to QoS policies by delaying the one or more non-compliant PDUs to provide shaped PDUs;
  thereafter communicating said shaped PDUs from said iSCSI initiator to a Transmission Control Protocol (TCP) layer, wherein shaping is performed external to said TCP layer;
  marking said shaped PDUs in said TCP layer according to said QoS policies;
  thereafter communicating said shaped PDUs to an IP network; and
  receiving said shaped non-compliant PDUs via said IP network at a target node; and shaping in the target node one or more read commands and one or more write commands extracted from said non-compliant PDUs according to QoS policies for I/O resources by delaying the one or more read commands and the one or more write commands, wherein the initiator node and the target node reside on separate nodes of the IP network.

14. The method according to claim 13, wherein network traffic in said initiator node comprises iSCSI traffic and non-iSCSI application traffic, wherein shaping comprises shaping said non-iSCSI application traffic in said TCP layer.

15. The method according to claim 13, wherein said target node provides access to a plurality of logical units (LU), each said LU having multiple task-sets, each said task-set having an associated class of service, wherein two or more of said associated classes of service are the same.

* * * * *